US012755397B2

(12) United States Patent
Öhrn et al.

(10) Patent No.: US 12,755,397 B2
(45) Date of Patent: Oct. 6, 2026

(54) OBJECT TRACKING USING SCENE-, OBJECT- AND LOCATION SPECIFIC TRACKING PARAMETERS

(71) Applicant: Axis AB, Lund (SE)

(72) Inventors: Anton Öhrn, Lund (SE); Johan Sternby, Lund (SE); Amanda Nilsson, Lund (SE)

(73) Assignee: Axis AB, Lund (SE)

( * ) Notice: Subject to any disclaimer, the term of this patent is extended or adjusted under 35 U.S.C. 154(b) by 367 days.

(21) Appl. No.: 18/341,004

(22) Filed: Jun. 26, 2023

(65) Prior Publication Data

US 2024/0005516 A1 Jan. 4, 2024

(30) Foreign Application Priority Data

Jun. 30, 2022 (EP) .................................... 22182253

(51) Int. Cl.
*G06T 7/20* (2017.01)
*G06V 10/764* (2022.01)

(52) U.S. Cl.
CPC .............. *G06T 7/20* (2013.01); *G06V 10/764* (2022.01); *G06T 2207/10016* (2013.01)

(58) Field of Classification Search
None
See application file for complete search history.

(56) References Cited

U.S. PATENT DOCUMENTS 10,397,485 B2 8/2019 Lundberg
11,704,812 B2 * 7/2023 Qian ......................... G06T 7/20 382/103
2021/0042532 A1 2/2021 Latapie et al.
2022/0277463 A1 * 9/2022 Schlattmann ......... A63F 13/812
2023/0249712 A1 * 8/2023 Chen ..................... G01S 17/931 701/26

FOREIGN PATENT DOCUMENTS

EP 3244344 A1 11/2017
WO 2020/205682 A1 10/2020

OTHER PUBLICATIONS

Nayak et al., "Vector field analysis for motion pattern identification in video," 2011 18th IEEE International Conference on Image Processing, Brussels, Belgium, pp. 2089-2092 (2011).

(Continued)

*Primary Examiner* — Vikkram Bali
(74) *Attorney, Agent, or Firm* — Volpe Koenig

(57) ABSTRACT

A method for tracking an object in a scene is provided, including receiving a first image frame of a first image stream capturing a scene; detecting or tracking a first object in the first image frame, and determining that the first object is in a first part of the first image frame; determining, using object detection, that the first object belongs to a first object class; determining, based on multiple values of a tracking parameter each specific for different parts of the first image frame and for different object classes, a first value of the tracking parameter for the first part of the first image and for the first object class, and tracking the first object in a second image frame of the first image stream subsequent to the first image frame, based on the first value of the tracking parameter.

16 Claims, 4 Drawing Sheets

(56) References Cited

OTHER PUBLICATIONS

Lin, "Introduction to Motion Estimation with Optical Flow," https://nanonets.com/blog/optical-flow/ , Available at: http://web.archive.org/web/20190918210651/ttps://nanonets.com/blog/optical-flow/ (Sep. 18, 2019).

Berclaz et al., "Multi-camera Tracking and Atypical Motion Detection with Behavioral Maps," In: Forsyth, D., Torr, P., Zisserman, A. (eds) Computer Vision—ECCV 2008. ECCV 2008. Lecture Notes in Computer Science, vol. 5304. Springer, Berlin, Heidelberg (2008).

Fleuret et al., "Multicamera People Tracking with a Probabilistic Occupancy Map," in IEEE Transactions on Pattern Analysis and Machine Intelligence, vol. 30, No. 2, pp. 267-282, (Feb. 2008).

Madrigal et al., "Motion priors for multiple target visual tracking," Machine Vision and Applications 26, 141-160 (2015).

* cited by examiner

OBJECT TRACKING USING SCENE-, OBJECT- AND LOCATION SPECIFIC TRACKING PARAMETERS

FIELD OF INVENTION

The present disclosure relates to tracking of objects in an image stream capturing a scene. In particular, the present disclosure relates to how such tracking may be improved based on statistical information about the scene.

TECHNICAL BACKGROUND

Various object tracking algorithms exist for tracking an object in multiple image frames of an image stream capturing a scene. Such "object trackers" may use e.g., Kalman-filtering or similar techniques to, based on own models of how objects supposedly moves and on regular inputs from an object detector responsible for detecting at least a position of an object in an image frame, predict how the object will move and where the object is thus likely to be found in one or more subsequent image frames of the image stream.

A video stream capturing a scene may however include multiple objects moving at e.g., different speeds and/or suddenly changing one or both of their speeds and directions of movement. As conventional object trackers are optimized objects moving at predefined speeds and/or directions of movements, such object trackers may thus struggle to properly, with great enough accuracy, track objects in such scenes. For example, an object tracker optimized to track slow-moving pedestrians may struggle to also properly track fast-moving present in the same scene. This may be particularly true if the vehicles also sometimes change their direction of movement and/or their speeds.

Consequently, there is therefore a need for an improved way of tracking an object in a scene.

SUMMARY

To at least partially satisfy the above-identified need, the present disclosure provides an improved method, device, computer program and computer program product for tracking an object in a scene, as defined in the accompanying independent claims. Various embodiments of the method, device, computer program and computer program product are defined in the accompanying dependent claims.

According to a first aspect of the present disclosure, there is provided a method for tracking an object in a scene. The method includes receiving a first image frame of a first image stream capturing a scene. The method further includes detecting or tracking a first object in the first image frame, and/including determining that the first object is (presumably) in a first part of the first image frame. The method further includes determining, based on at least one set of multiple values of a tracking parameter each specific for different parts of the first image frame, a first value of the tracking parameter for the first part of the first image frame. Phrased differently, the multiple values are each specific for a different part of the first image frame. The method further includes tracking the first object in a second image frame of the first image stream subsequent to the first image frame, based on the obtained first value of the tracking parameter.

The solution (as implemented e.g., by the method of the first aspect) of the present disclosure improves upon currently available technology in that the tracking parameter is made dependent on in what part of an image frame an object is detected, such that the tracking parameter may be assigned different values for different parts of the image frame. This allows to more accurately track all objects of a scene in which objects often move at different speeds in different parts of the scene. For example, in a scene wherein e.g., cars drive in one part of the scene and pedestrians walk in another part of the scene, different tracking parameter values may thus be assigned for the tracking of the cars and the tracking of the pedestrians, respectively. This in contrast to conventional technology using global tracking parameters, which technology may suffer if there are e.g., multiple objects in the scene moving at substantially different speeds. The concept of global tracking parameters may e.g., correspond to an assumption that all objects supposedly move in a same way (e.g., with a same speed and/or in a same direction) independent of where in the scene an object is located, and/or independent on to which class an object belongs.

As used herein, a function mapping the location of an object in an image frame to a particular value of the tracking parameter may be both two- and three-dimensional. Phrased differently, the value of the tracking parameter may be based only on where in an image frame an object is detected, or the value of the tracking parameter may instead be based on where in the actual scene the object is detected/estimated to be. In the latter case, a size of an object in an image frame may for example be used to estimate where in the scene (e.g., at what distance from a camera capturing the scene) the object is located. Phrased differently, and as will be explained in more detail later herein, the value of the tracking parameter may depend either only on an object's location in an image frame, or may depend on an estimated location of the object in the scene. As recited in claim 1, the position of an object in the first image frame may e.g., be determined by object detection, or be based on an ongoing tracking of the object from one or more previous image frames of the first image stream.

In some embodiments of the method, the at least one set of multiple values of the tracking parameter may include multiple sets specific for different object classes. Examples of different such object classes may e.g., include people, animals, vehicles, or similar, and it is envisaged that an object detector used to detect the first object is then capable to not only determine that there is an object in the scene, but to also determine to which such object class the detected object belongs. Classifying objects into different object classes may be performed using any technology suitable for such a purpose. The method may then further include determining that the first object belongs to a first object class, and determining that the first value of the tracking parameter based on a set (of the multiple sets of multiple values, where each such set is specific for a particular object class) specific for the first object class. Making the first value of the tracking parameter specific not only for object position in the image frame but also on object class, the envisaged tracking of the object may thus use different parameters also for objects belonging to different object classes. For example, in the event both a pedestrian and a car happen to be present in a same part of the first image frame (e.g., when the car passes the pedestrian, or similar), the car and pedestrian can later be tracked using different tracking parameter values even though they were detected in a same part of the first image frame, which may further improve the accuracy of the envisaged tracking. If the position of the object in the first image frame is determined by object detection, determining that the object belongs to a specific object class may then be performed as part of such detection. If the object is instead being tracked and the position of the object in the first image frame is determined from such tracking, information about which object class the object belongs to may e.g., be obtained from an object detection made in e.g., one or more earlier image frames, or similar.

In some embodiments of the method, the method may further include detecting or tracking another, second object in the first image frame, and determining that the second object is (presumably) in a second part of the first image frame. The method may further include determining, based on the at least one set of multiple values for the tracking parameter, a second value of the tracking parameter for the second part of the first image. The method may further include tracking the second object in the second image frame of the first image stream, based on the second value of the tracking parameter. The envisaged method thus enables simultaneous tracking of multiple objects, where objects in different parts of the scene can be tracked using different tracking parameter values.

In some embodiments of the method, the method may further include determining that the second object belongs to a second object class, and determining the second value of the tracking parameter based on a set of the multiple sets specific for the second object class. The envisaged method thus enables simultaneous tracking of multiple objects, where objects belonging to different object classes can be tracked using different tracking parameter values.

As will be further described later herein, the envisaged method thus enables to provide different tracking parameter values when tracking e.g., two objects of a same object class at different locations in the scene (e.g., the first and second object classes are the same object class and the first and second parts of the first image frame are different parts), when tracking e.g., two objects of different object classes at a same location in the scene (e.g., the first and second object classes are different object classes and the first and second parts of the first image frame are the same part), and when tracking e.g., two objects of different object classes at different locations in the scene (e.g., when the first and second object classes are different object classes and the first and second parts of the first image frame are different parts). As also envisaged herein, the method may provide different tracking parameters for two objects which belong to a same object class (e.g., the first and second object classes are a same object class) and are detected in a same part of the first image frame (e.g., the first and second parts of the first image frame are a same part). In such a situation, a relative size difference of the two objects may e.g., be used to infer whether one object is e.g., closer or further away to/from the camera than the other object, and the tracking parameter value for the respective object may be chosen in accordance therewith. This may e.g., be applicable if two cars pass each other when driving on different roads, where both cars end up being present in a same part of the first image frame. If the cars are e.g., driving at a same real speed, one car may move faster than the other in the image stream depicting such a scene, due to the difference in distance between the cars and the camera used to generate the image stream, and different tracking parameters can be used for the two cars to account for this difference.

In some embodiments of the method, the tracking parameter may include at least one of object speed, object movement direction, object size, a threshold or score for object detection, and e.g., an object occurrence frequency. Other tracking parameters are of course also envisaged as being used, but not discussed further herein.

In some embodiments of the method, the at least one set of multiple values for the tracking parameter may include values for the tracking parameter as well as uncertainties for the values. Using also uncertainties may e.g., help to reveal information (to the tracker) about how objects e.g., move in the scene which is not available from e.g., only an average speed at a particular part of the first image frame. For example, in a scene including e.g., a walkway wherein people are allowed to walk in both directions, an average speed of all objects in a particular part of the first image frame may be zero, or approximately zero (if people are assumed to walk at approximately a same speed, and with approximately a same number of people walking in one direction as a number of people walking in the other direction). However, the uncertainty for such a parameter value would be higher, and the tracker may use the indication of high uncertainty to determine that it should rely more heavily on traditional tracking (using e.g., one or more global tracking parameters) than on the value of the tracking parameter provided in the at least one set of multiple values for the tracking parameter). Herein, "uncertainty" may e.g., be provided as a measure of standard deviation or similar, while the actual value of the tracking parameter may e.g., be provided as an average/mean value or similar. In any case, providing both the value and its uncertainty to the tracker may help the tracker to better adjust to different situations.

In some embodiments of the method, the method may further include obtaining the at least one set of multiple values for the tracking parameter by gathering statistics pertinent to the tracking parameter based on object detection and/or object tracking of one or more objects performed in multiple image frames of an image stream capturing the scene, and generating the at least one set of multiple values for the tracking parameter based on the gathered statistics. Herein, that the statistics is/are pertinent to the tracking parameter means that if the tracking parameter is e.g., object speed, the statistics should be relevant to object speed, and include e.g., average speed of objects at each part of a scene/image frame, and similar for other possible tracking parameters. In some embodiments, the multiple image frames used to gather the statistics may for example be image frames captured before the first image frame (or e.g., before also the second image frame) referred to earlier herein. Analysis of the multiple image frames to gather statistics can e.g., be performed offline, or during normal operation of a camera.

In some embodiments of the method, the image stream including the multiple image frames used to gather the statistics may be the first image stream including the first frame. In other embodiments, it may be envisaged that e.g., another camera than the one used to capture the first image stream is used to gather the statistics, such that a first camera may focus on real-time/live tracking of objects in the scene, while a second camera is used to gather and deliver the statistics to the first camera.

The statistics may e.g., be collected before the first image frame 240*a* is analyzed, e.g., by analyzing image frames captured during some time period before the time the first image frame 240*a* is captured. In other embodiments, it is envisaged that the statistics may also be gathered based on multiple image frames captured after the first image frame, and that e.g., the so-gathered statistics may be used to retroactively track objects in earlier frames, or similar. The present disclosure is thus not limited to any specific time-of-events with regards to the gathering of the statistics, as long as, when an object is to be tracked in an image frame subsequent to the first image frame, statistics is/are available in order to generate (or at least update) the one or more sets of multiple (location-specific) values of the tracking parameter.

In some embodiments, the method may further include dynamically updating the at least one set of multiple values for the tracking parameter based on the detection of the first object in the first image frame and/or on the tracking of the first object in the second image frame. The envisaged method may thus e.g., better adapt to changes in the scene, such that when for example objects start to move faster in one part of the scene than before, or similar, which may happen due to e.g., a road suddenly becoming blocked or constricted, or similar.

According to a second aspect of the present disclosure, there is provided a device for tracking an object in a scene. The device includes processing circuitry configured to cause the device to: receive a first image frame of an image stream capturing a scene; detect or track a first object in the first image frame and determine (as part of the detection or tracking) that the first object is in a first part of the first image frame; determine, from at least one set of multiple values of a tracking parameter each specific for different parts of the first image frame, a first value of the tracking parameter for the first part of the first image frame, and track the first object in a second image frame of the first image stream subsequent to the first image frame, based on the obtained first value of the tracking parameter. The device is thus configured to perform the steps of the method according to the first aspect. The device may e.g., include memory storing instructions that, when executed by the processing circuitry of the device, causes the device to perform the method steps. This may be achieved by the processing circuitry being configured to read and execute the instructions stored in the memory.

In some embodiments of the device, the processing circuitry may be further configured to cause the device to perform the steps of any envisaged embodiment of the method discussed and disclosed herein.

In some embodiments of the device, the device may be a monitoring camera configured to generate the first image stream capturing the scene (when pointed towards the scene). The camera may e.g., include an image sensor and a lens, arranged such that the lens focuses incoming light on the image sensor, and such that the image sensor is communicatively connected to the processing circuit such that the processing circuitry may receive e.g., the pixel data needed to generate the various image frames of the first image stream from the image sensor. Performing the envisaged method already in the camera may be beneficial in situations where the camera is normally responsible for performing the tracking of objects in a scene, as this may e.g., reduce the amount of data having to be sent between e.g., the camera and a video management system (VMS).

According to a third aspect of the present disclosure, there is provided a computer program for tracking an object in a scene. The computer program includes computer code that, when running on processing circuitry of a device, causes the device to: receive a first image frame of an image stream capturing a scene; detect or track a first object in the first image frame and determine that the first object is in a first part of the first image frame; determine, from at least one set of multiple values of a tracking parameter each specific for different parts of the first image frame, a first value of the tracking parameter for the first part of the first image frame, and track the first object in a second image frame of the first image stream subsequent to the first image frame, based on the obtained first value of the tracking parameter. The computer code is thus such that it causes the device to perform the steps of the method of the first aspect.

In some embodiments of the computer program, the computer code may be further such that it, when running on the processing circuitry of the device, causes the device to perform any embodiment of the method of the first aspect as discussed and disclosed herein.

According to a fourth aspect of the present disclosure, there is provided a computer program product. The computer program product includes a computer-readable storage medium, on which a computer program according to the third aspect (or any embodiment thereof discussed and disclosed herein) is stored. As used herein, the computer-readable storage medium may e.g., be non-transitory, and be provided as e.g., a hard disk drive (HDD), solid state drive (SDD), USB flash drive, SD card, CD/DVD, and/or as any other storage medium capable of non-transitory storage of data. In other embodiments, the computer-readable storage medium may be transitory and e.g., correspond to a signal (electrical, optical, mechanical, or similar) present on e.g., a communication link, wire, or similar means of signal transferring.

Other objects and advantages of the present disclosure will be apparent from the following detailed description, the drawings and the claims. Within the scope of the present disclosure, it is envisaged that all features and advantages described with reference to e.g., the method of the first aspect are relevant for, apply to, and may be used in combination with also the device of the second aspect, the computer program of the third aspect, and the computer program product of the fourth aspect, and vice versa.

BRIEF DESCRIPTION OF THE DRAWINGS

Exemplifying embodiments will now be described below with reference to the accompanying drawings, in which.

Figure 1A:
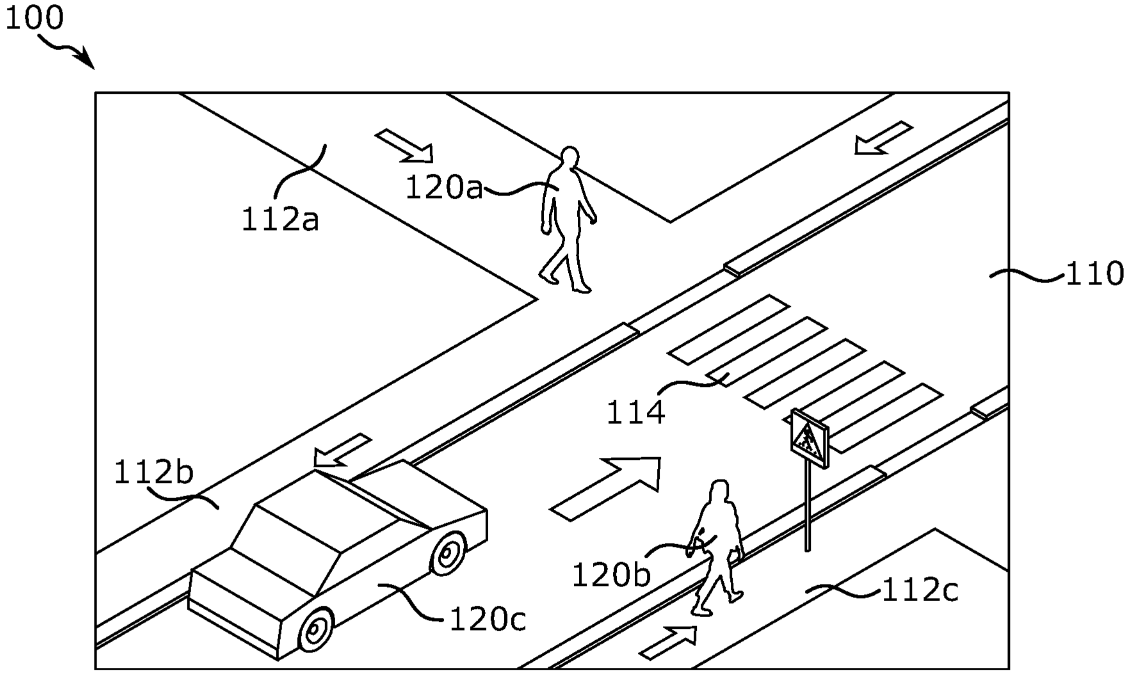
FIGS. 1A and 1B schematically illustrate an example scene in which the envisaged solutions of the present disclosure are applicable.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

An example scene in which various embodiments of a method, device, computer program and computer program product as envisaged herein are applicable will now be described with reference to FIGS. 1A and 1B.

FIG. 1A schematically illustrates a snapshot of an example scene 100, as provided in e.g., a particular image frame of an image stream capturing the scene 100. The image stream is for example generated by a monitoring camera pointing towards the scene. The monitoring camera may e.g., be used for surveillance, traffic situation analysis, or other tasks in which being aware of what is happening in the scene 100 is desirable.

In the scene 100, a road 110 for vehicles extends between a lower left to an upper right of the image frame. There are also various structures arranged for pedestrians, such as a walkway 112*a* crossing the road 110, and first and second sidewalks 112*b* and 112C each following the road 110 on opposite sides of the road 110. Various walkways 112*a*, 112*b* and 112C are also arranged, such that a first walkway 112*a* crosses the road 110, while second and third walkways 112*b* and 112C arranged along a respective side of the road 110. Each of the walkway 112*a* and walkways 112*b* and 112C have mandatory directions of walking, as illustrated by the various arrows.

In the snapshot of the scene 100 depicted in FIG. 1A, a first person 120*a* is walking along the walkway 112*a*, and is about to cross the road no on a pedestrian crossing 114 arranged for this purpose. A second person 120*b* is walking along the second walkway 112C, and a car 120C is driving along the road no and approaching the pedestrian crossing 114.

Figure 1B:
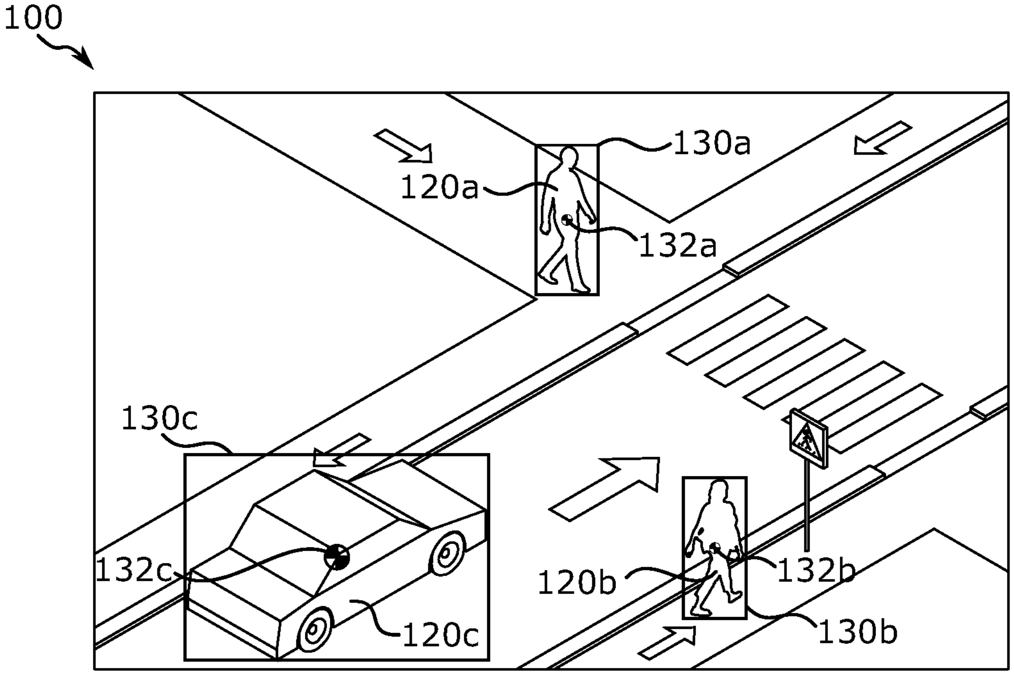

FIG. 1B schematically illustrates a same snapshot of the scene 100, but with the results of various object detection in the image frame illustrated by rectangular boxes. As can be seen in FIG. 1B, the object detection has correctly identified the first person 120*a* as indicated by the rectangular box 130*a*, the second person 120*b* (as indicated by the rectangular box 130*b*), and also the car 120C as indicated by the rectangular box 130*c*. For the present example, it will be assumed that the positions of the various objects in the scene 100 are indicated by center points 132*a-c* of the respective rectangular boxes 130*a-c*, although other alternatives for indicating a position of an object in the scene, and in an image frame capturing the scene, may of course also be used. In some embodiments, the positions of the various objects may instead be determined as part of an ongoing tracking of the objects in one or more previous image frames.

It is further assumed that it is desirable to track the movements of the objects 120*a-c* in one or more subsequent image frames of the scene (not shown). This can, as is conventionally done, be achieved e.g., by the object detector used to detect the objects 120*a-c* providing information about the positions (i.e., the center points 132*a-c*) of the objects 120*a-c* to an object tracker, which in turn uses e.g., Kalman filtering or similar techniques to predict how the various objects 120*a-c* will move in one or more subsequent frames based on regular position updates received from the object detector, and based on its own model/statistics about the movement of the objects, as commonly used in the field of object tracking in images. The conventional object tracking normally uses global tracking parameters, i.e., it applies a same assumption about e.g., at what speed, and/or in which direction, an object will usually move, wherein this assumption is the same for all objects and all positions in the scene. As a consequence, the conventional object tracker may struggle if forced with the task of tracking multiple objects which for example moves at different speeds and/or in different directions. The conventional object tracker may in particular struggle if tracking objects which suddenly changes their directions.

How the envisaged solution according to the present disclosure overcomes these issues with conventional object trackers will now be described in more detail with reference first to FIGS. 2A to 2D.

Figure 2A:
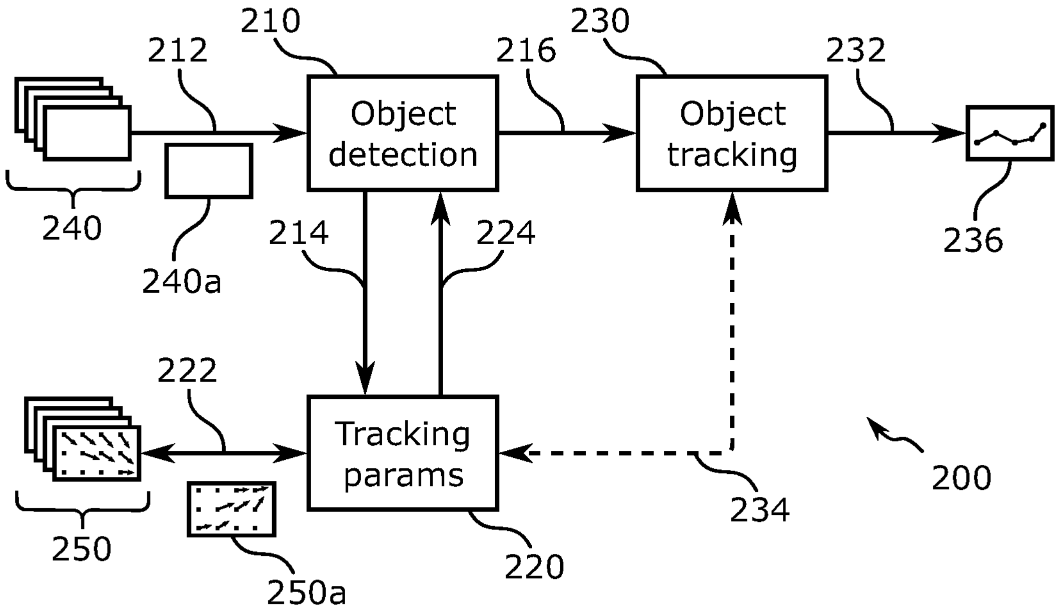
FIG. 2A schematically illustrates, in terms of various functional units, embodiments of a method and device according to the present disclosure.
Figure 2B:
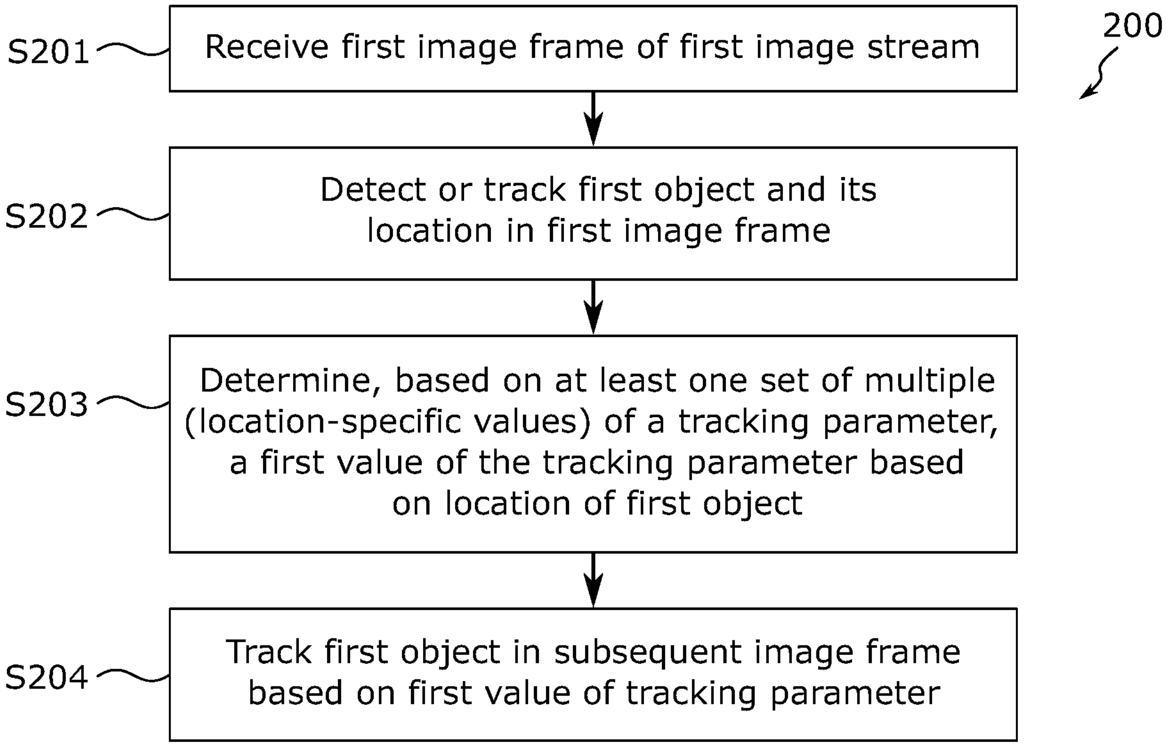
FIG. 2B schematically illustrates a flowchart of embodiments of a method according to the present disclosure.

FIG. 2A schematically illustrates, using a number of functional units/modules 210, 220 and 230, an embodiment of a method 200 as envisaged herein. FIG. 2A also serves to illustrate the working principle of a device for performing the method 200, as also envisaged herein and as will be described later with reference also to FIGS. 3A and 3B. FIG. 2B schematically illustrates a flowchart of the various steps performed in the method 200.

An object detection module 210 receives a plurality of image frames of a first image stream 240, wherein each image frame of the first image stream 240 captures a particular snapshot/time instance of the scene 100 of interest. In particular, in a step S201, the object detection module 210 receives a first image frame 240*a* of the first image stream 240, as part of e.g., a signal 212 sent from an image sensor (not shown) used to capture the first image stream 240. The object detection module 210 then, in a step S202, detects a first object (e.g., one of the objects 120*a-c* as illustrated in FIG. 1A or 1B) in the first image frame 240*a*, and also determines that the first object is in a first part of the first image frame 240*a*.

The object detection module 210 then, as part of a signal 214, sends the determined location of the first object in the first image frame 240*a* to a tracking parameter module 220. The location (i.e., an indication telling the tracking parameter module 220 that the first object was detected in the first part of the first image frame 240*a*) may e.g., be provided as a pixel coordinate (corresponding to e.g., the center points 232*a-c* as shown in FIGS. 1A and 1B), or similar. The location may instead, or in addition, be provided as a polygon indicating e.g., an outline of the detected first object, a coordinate indicating a center of mass/gravity of the first object, or similar, as long as the tracking parameter module 220 receives at least some indication of in which part of the first image frame 240*a* the detected first object is determined to be located.

In a step S203, the tracking parameter module 220 determines a first value of the tracking parameter based on the determined position (e.g., the first part) of the detected first object in the first image frame 240*a*. For this purpose, the tracking parameter module 220 obtains at least one set 250*a* of multiple values for the tracking parameter, wherein these values are specific for different parts of the first image frame 240*a*. The at least one set 250*a* may e.g., be provided to the tracking parameter module 220 as part of a signal 222, for example from a storage (not shown) storing the at least one set 250*a* or even multiple such sets 250 as will be described later herein in more detail. After having determined the first value of the tracking parameter based on the position (i.e., the first part) of the first object in the first image frame 240*a*, the tracking parameter module 220 sends the first value of the tracking parameter as part of e.g., a signal 224 to the object detection module 210.

As envisaged herein, in some situations, the set 250*a* of multiple values may include a value specific for exactly the position of the first object in the first image frame 240*a*. If this is the case, the tracking parameter module 220 may pick this specific value as the first value of the tracking parameter. In other situations, there may not be a value available in the set 250*a* which exactly matches the position of the first object in the first image frame 240*a*. In such situations, the tracking parameter module 220 may for example use interpolation to estimate the first value of the tracking parameter at the location of the first object based on one or more values specific for other, but nearby locations of the first image frame 240*a*. Such interpolation may e.g., be linear, quadratic, or similar depending on the situation. Using such interpolation may e.g., be beneficial as the number of values in the set 250*a* may be kept relatively small, even if the possible number of different locations at which an object can be determined to be located in an image frame is large.

The object detection module 210 receives the first value of the tracking parameter from the tracking parameter module 220 and sends it to an object tracking module 230, as part of e.g., a signal 216. In a step S204, the object tracking module 230 then tracks the first object in a second image frame (not shown) of the first image stream 240, in order to e.g., as part of a signal 232, generate a track 236 indicative of how the first object has moved in the scene 100. In particular, the object tracking module performs such tracking of the first object based on the first value of the tracking parameter received from the object detection module 210. The tracking performed by the object tracking module 230 may thus utilize different tracking parameter values depending on in which part of the first image frame 240*a* an object is determined to be located. The object tracking module 230 may, for example, output information regarding its estimation of the location/movement of the first object in the second frame as part of a signal 232, to for example generate a track 236 describing how the first object moves in the first image stream 240 over time.

In some embodiments of the method 200, the first value of the tracking parameter may instead be sent directly from the tracking parameter module 220 to the object tracking module 230, for example as part of a signal 234. In this case, the object detection module 210 may only be responsible for providing the determined position of the first object to the tracking parameter module 220.

In some embodiments of the method 200, there may be multiple sets 250 of multiple values, where each such set is specific for a particular object class. In such embodiments, the object detection module 210 may also, in addition to detecting the first object and its position in the first image frame, also determine to which object class the first object belongs (e.g., that the first object belongs to a first object class). The object detection module 210 may then, e.g., as part of the signal 214, send an indication of the first object class to the tracking parameter module 220, and the tracking parameter module 220 may select the right set 250*a* of multiple values from the multiple sets 250 based on the first object class, e.g., such that the set 250*a* is the, or at least a, set specific for the first object class. As also envisaged herein, if the position of an object in the first image frame 240*a* is instead determined as part of an ongoing tracking of the object, information about which object class the object presumably belongs to may be provided from e.g., an object detection module (such as the object detection module 210) used to identify the class of the object in one or more image frames earlier than the first image frame 240*a*, or similar.

In some embodiments of the method, the various sets of multiple values of the tracking parameter may be dynamically updated based on the object detection and/or tracking performed by the modules 210 and 230. For example, the tracking parameter module 220 may receive updates about where objects are detected in the image frames of the first image stream 240 from the object detection module 210 (as part of e.g., the signal 214 or some other signal), and/or receive updates about how the objects move in the first image stream 240 as estimated by the object tracking module 230 (as part of e.g., the signal 234 or some other signal). The tracking parameter module 220 may then update the sets 250 of multiple values of the tracking parameter.

In some embodiments, determining the position of an object in the first image frame 240*a* may instead be performed as part of an ongoing tracking of the object, and performed e.g., by the object tracking module 230. The important part is that there is, somehow, provided a presumed position of the object within the first image frame 240*a*, such that a particular tracking parameter value specific for the part of the first image frame 240*a* in which the object is presumed to be.

In some embodiments, the structure and flow illustrated in FIG. 2A may also be used to generate the statistics needed to define/generate the various one or more sets 250 of multiple values of the tracking parameter in the first place. Based on information received from the object detection module 210 and/or the object tracking module 230, the tracking parameter module 220 may gather statistics pertinent to the tracking parameter, for one or more objects detected and/or tracked by the modules 210 and/or 230. Such statistics can then be stored e.g., by the tracking parameter module 220, and used to generate the one or more sets 250 of multiple values for the tracking parameter. If taking also object class into account, such statistics may of course be gathered for each available object class, such that for example the sets 250 may include one set of multiple values for the tracking parameter for each object class.

In some embodiments, such statistics gathering may be performed based on a same image stream as the first image stream 240 from which the first image frame 240*a* is obtained. In other embodiments, the statistics gathering may be performed based on some other image stream also capturing the same scene 100, but as e.g., captured using another camera.

Figure 2C:
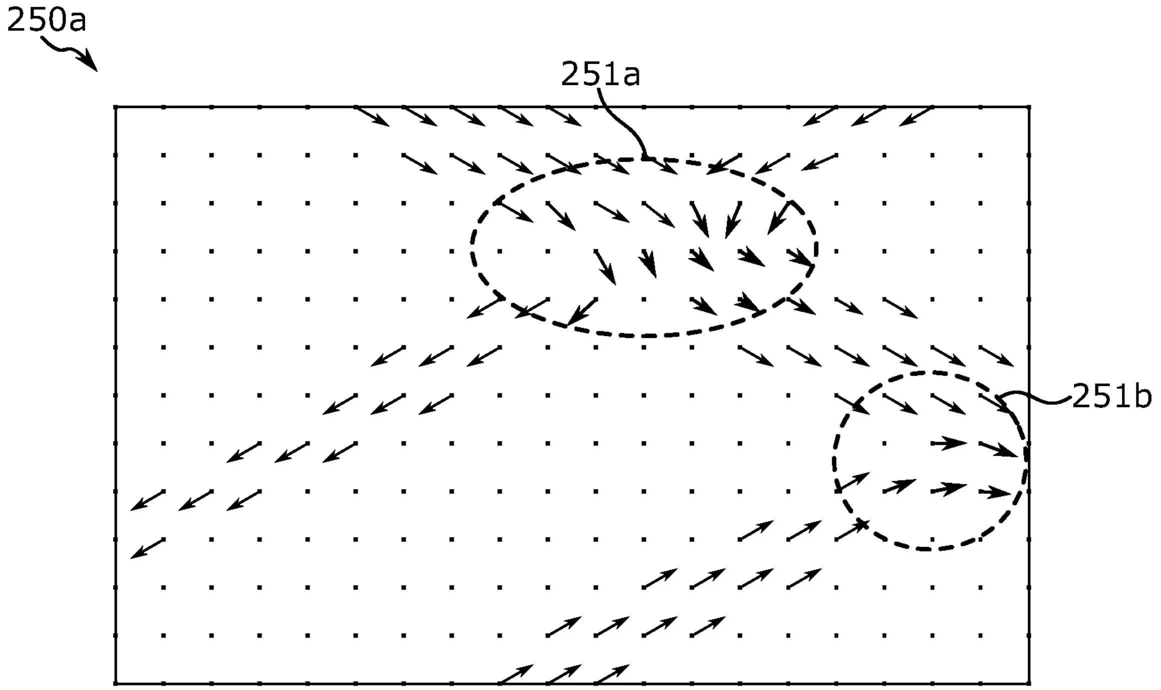
FIGS. 2C and 2D schematically illustrate various examples of location-dependent tracking parameter values as generated by embodiments of a method according to the present disclosure applied on the example scene of FIGS. 1A and 1B, and FIGS. 3A and 3B schematically illustrate various embodiments of a device according to the present disclosure.
Figure 2D:
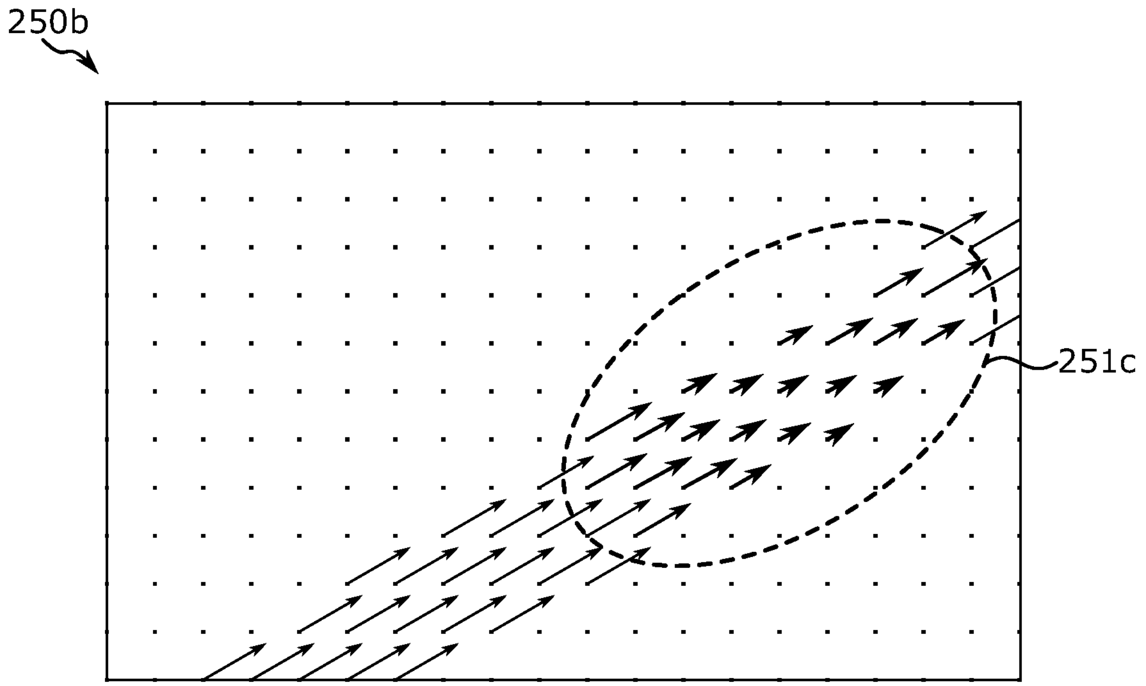

Examples of a set of multiple values of a tracking parameter as envisaged herein will now be provided with reference also to FIGS. 2C and 2D.

FIG. 2C schematically illustrates first set 250*a* of multiple values of a tracking parameter in form of a vector field. The vector field is defined at a plurality of points spaced on a grid, and each such point defines a vector (as indicated by the arrows) which points in a particular direction and has a particular magnitude. This vector field provides an average speed at which objects have moved in the scene 100. In this particular example, the vector field 250*a* is a set which is specific to an object class corresponding to persons. The vector field 250*a* thus has arrows of finite length only in places where persons normally walk in the scene 100, i.e., on the walkway 112*a* and on the sidewalks 112*b* and 112C, as can be seen if at least overlaying the vector field 250*a* on top of the image frame depicting the scene 100 in FIG. 1A. In particular, it may be seen that people, on average, as the direction of the arrows in the vector field 250*a* more or less follows the mandatory directions of walking as illustrated by the arrows in FIG. 1A.

The arrows of the vector field 250*a*, as illustrated in FIG. 2C, are also such that their boldness/weight are proportional to an uncertainty of the tracking parameter which they represent (in this case speed at which the objects, on average, move at different parts of an image frame). From FIG. 2C, it is apparent that there exist at least two regions 251*a* and 251*b*, in which the uncertainty is greater than elsewhere due to people changing their direction of walking in these regions 251*a* and 251*b*. An object tracker receiving and using the vector field 250*a* may thus take into account that in the regions 251*a* and 251*b*, the object tracker should preferably rely more heavily on traditional object tracking, while in regions different than those of the regions 251*a* and 251*b*, the object tracker may use the information about the usual direction and speed of movement of the objects (i.e., persons) in order to improve the accuracy of its predictions.

Although not shown herein in any Figure, the tracking parameter may, as described herein, also or in addition include other details than average speed and direction of movement of objects, such as e.g., only the speed (in which case the vector field 250*a* would become a scalar field, providing only a number corresponding to speed at each grid point). Other examples include e.g., only a direction of movement (in which case the vector field 250*a* would have arrows all having a same magnitude). Yet further examples include e.g., the tracking parameter being e.g., a threshold or score for object detection, or any other parameter which indicates how certain the object detector has been when determining the position of an object in a certain part of an image frame. For example, some parts of a scene may have worse conditions for object detection than in other parts of the scene, and the object detector may thus struggle in these parts of the scene. Such worse conditions may for example include worse lighting conditions, complex backgrounds, or other conditions which make the object detector struggle. By indicating such struggling in the set of multiple values for the tracking parameter, the object tracker may know that in for example one particular part of an image frame, the object detector is less certain of its findings, and the object tracker may then take this into account when attempting to track an object in such a particular part of the image frame. Other examples of tracking parameters may e.g., include frequency of occurrence of objects, or e.g., size of objects in various parts of an image frame. For example, knowledge about an average size of objects in a particular part of an image frame may e.g., help the object tracker to determine whether the object is near or far away from the camera capturing the scene, and the object tracker may then adjust its algorithm accordingly.

If e.g., the tracking parameter includes at least statistical (e.g., historical) direction of movement of an object for various parts of an input frame, the object tracker may know that in e.g., one region of a scene, objects are likely to suddenly change their direction of movement. By having this knowledge, the object tracker may refrain from discarding a guess indicating such an abrupt change in direction, as the object tracker knows that this is how objects in that particular region usually moves and not e.g., caused by calculation errors or bad indications from the object detector, and similar.

Generally herein, it should be noted that a set of multiple values of a tracking parameter may provide a function which e.g., maps different image frame coordinates to different tracking parameter values, or e.g., provide a function which maps different scene coordinates to different tracking parameter values. For example, a set of multiple values as envisaged herein may provide (or at least approximate) a function F(x, y) which maps an image frame coordinate (x, y) to a particular tracking parameter value. Such a function may or may not take into account e.g., the perspective of the camera used to capture the image frames and e.g., a distance from an object seen in an image frame to the camera. If taking e.g., the perspective and/or the distance to the camera into account, the function may be another function G (X, Y, Z) which maps a scene coordinate (X, Y, Z) into a particular tracking parameter value. Determining the first value of the tracking parameter may then include performing a mapping from image frame coordinates (x, y) to scene coordinates (X, Y, Z), using e.g., sizes of objects to estimate how far away from the camera they are, and using e.g., camera perspective (as defined by the cameras location relative to the scene, a field of view of the camera, a tilt/rotation of the camera, or similar). For example, a function h(x, y) may be provided which outputs scene coordinates based on image frame coordinates, and the first value of the tracking parameter may then be obtained from G(h(x, y)). Phrased differently, the envisaged solution herein is not bound to use only image frame coordinates directly, but may also attempt to take into account wherein a particular object is located in the scene when assigning the value to the tracking parameter. This may be useful in e.g., an image frame where two cars end up being in a same part of the first image frame although they are located in different areas of the scene. For example, if the cars are driving at a same real speed, the car closer to the camera will likely move faster in the first image stream than the car further away from the camera, and the tracking parameter value used by the object tracker should therefore be different for the two cars to take this account.

As an illustrative example of the concept envisaged herein, it may be assumed that a tracking parameter e.g., corresponds to how fast, and in what direction, objects statistically/historically (e.g., on average) move when being in a certain part of an image frame. As an example, such a tracking parameter may be defined as a vector field F(x, y) which, for each position (x, y) in an image frame provides a vector $(v_x, v_y)=F(x, y)$, where $v_x$ and $v_y$ are e.g., average velocity components (as historically determined over time) in the x- and y-direction of the image frame, respectively, at position (x, y) of the image frame. An object tracker faced with the task of tracking an object which is currently located (or at least assumed to be located) at a position $(x_1, y_1)$ in a first image frame may thus consult the tracking parameter field f(x, y), and obtain therefrom an expected velocity vector $(v_{x1}, v_y)=F(x_1, y_1)$. The tracker may then use this information when estimating the next position $(x_2, y_2)$ of the object, e.g., a position in a subsequent second image frame. If, for example, a time distance between the first image frame and the second image frame is Δt, the tracker may for example make the assumption that in the second image frame, the object is likely (based on historical data for the particular objected gathered over time) to have moved to the second position $(x_2, y_2)=(x_1+v_{x1}\Delta t, y_1+v_{y1}\Delta t)$. In further embodiments, the tracking parameter can also be made object class dependent, such that the tracker may e.g., receive a velocity vector $$(v_x^{car}, v_y^{car})$$

if the object is a car, a velocity vector $$(v_x^{person}, v_y^{person})$$

if the object is a person, and so on, and thereby better track different types of objects using different tracking parameters, even if two objects belonging to different object classes happen to appear at a same position of an image frame. Phrased differently, the vector field for a particular tracking parameter can be made dependent also on object class, such that e.g., F(x, y; Ω) returns a velocity vector $$(v_x^{\Omega}, v_y^{\Omega})$$

for an object belonging to class Ω and detected/estimated to be in a part (x, y) of an image frame. Other configurations and usages of the tracking parameter (fields) as envisaged herein are of course also envisaged. The tracker may also e.g., combine the historical information obtained from the tracking parameter (fields) with other information, such as one or more parameter values related to an ongoing tracking of an object, or similar, such as a current estimated speed, direction, etc., of the object.

FIG. 2D schematically illustrates another example of a set of multiple values 250*b*, also generated for the scene 100 shown in FIGS. 1A and 1B, but this time for another object class corresponding to e.g., cars. As can be seen in FIG. 2D, the vector field 250*b* therefore has arrows of finite amplitude only in the region of the road 110, as cars are less likely to drive e.g., on the walkway 112*a* and/or on the sidewalks 112*b* and 112C. The vector field 250*b* has a region 251*c* in which the uncertainty of the values increases, as can be seen by the increased boldness/weight of the arrows in the region 251*c*. This uncertainty may e.g., be due to the pedestrian crossing 114, as cars may drive by with a maintained speed in situations where there are no persons wanting to cross the road 110, but may have to slow down in situations where there are e.g., one or more persons standing at the crossing 114 waiting to cross the road 110. The amplitudes of the arrows in the region 251*c* are thus smaller than outside the region 251*c*, while the uncertainties of the values in the region 251*c* are larger. As mentioned earlier herein, the object tracker may use this information to understand that it is normal for an object (i.e., a car) to suddenly change its speed in the region 251*c* of e.g., the first image frame. As seen in FIG. 2D, the object tracker may also use the fact that the arrows in the vector field 250*b* are also on average longer than the arrows of the vector field 250*a*, as cars normally move faster than pedestrians, and take also this information into account when attempting to track a particular object.

FIGS. 2C and 2D also serve to illustrate embodiments of the envisaged method in which the object class of a detected object is taken into account, such that the first value of the tracking parameter depends both on where in the first image frame (and consequently, in some embodiments, also where in the scene) a detected object is located, and on to which object class the detected object belongs. As already mentioned herein, this has the benefit that the object tracker does not need to use a same tracking parameter for both e.g., cars and pedestrians, which may improve the accuracy of the predictions of the object tracker as cars and pedestrians usually move with different speeds. A same object tracker may therefore be used to track objects belonging to different object classes without ending up being more optimized towards one type of object and being less optimized towards another type of object.

A device for tracking an object in an image stream as envisaged herein will now be described in more detail with reference to FIGS. 3A and 3B.

Figure 3A:
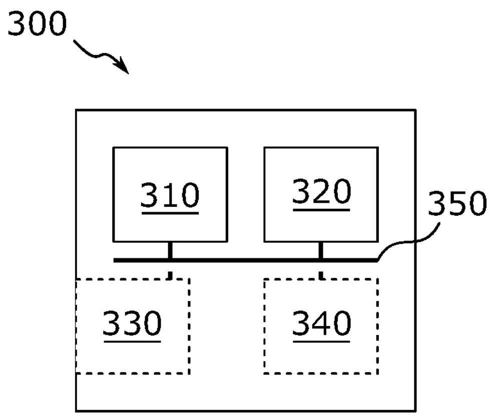

FIG. 3A schematically illustrates, in terms of a number of functional units/modules/blocks, the components of various embodiments of a device 300 as envisaged herein. The device 300 includes processing circuitry 310. The processing circuitry 310 is provided using any combination of one or more of a suitable central processing unit (CPU), multiprocessor, microcontroller, digital signal processor (DSP), etc., capable of executing software instructions stored in a computer program product (not illustrated herein), e.g., in form of a computer-readable storage medium 320. The processing circuit 610 may further be provided as at least one application specific integrated circuit (ASIC), or field-programmable gate array (FPGA).

Particularly, the processing circuitry 310 is configured to cause the device 300 to perform a set of operations, or steps, such as one or more of steps S201-S204 as disclosed above e.g., when describing the method 200 illustrated in FIGS. 2A to 2D. For example, the storage medium 320 may store a set of operations, and the processing circuitry 310 may be configured to retrieve the set of operations from the storage medium 320 to cause the device 300 to perform the set of operations. The set of operations may be provided as a set of executable instructions. Thus, the processing circuitry 310 is thereby arranged to execute methods as disclosed herein e.g., with reference to FIGS. 2A to 2D.

The storage medium 320 may also include persistent storage, which, for example, can be a memory in form of any single or combination of magnetic memory, optical memory, solid state memory or even remotely mounted memory.

The device 300 may further include a communications interface 330 for communications with other entities, functions, nodes, and devices, such as e.g., the camera and image sensor used to capture the first image stream, or any other image stream, capturing the scene. For example, the communications interface 330 may allow the device 300 to communicate with the camera in order to receive multiple image frames of an image stream capturing the scene. As such, the communications interface 330 may include one or more transmitters and receivers, including analogue and/or digital components. As already mentioned earlier herein, the device 300 may in some embodiments be the (monitoring) camera used to generate the image stream capturing the scene, and the communications interface 330 may e.g., include any necessary circuitry to e.g., allow the processing circuitry 310 of the device/camera 300 to access image data produced by an image sensor (not shown) of the device/camera 300.

The processing circuitry 310 controls the general operation of the device 300 e.g., by sending data and control signals to the communications interface 330 and the storage medium/memory 320, by receiving data and reports from the communications interface 330, and by retrieving data and instructions from the storage medium 320. Other components, as well as their related functionality, of the device 300 may of course also be included (as illustrated by the dashed box 340), but any description thereof is omitted in order not to obscure the concepts presented herein. A communications bus is included and configured to allow the various units 310, 320 and 330 (and optionally also 340) to exchange data and information with each other as required.

Figure 3B:
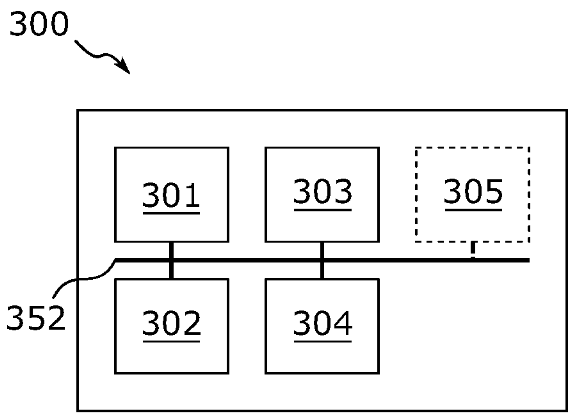

FIG. 3B schematically illustrates, in terms of a number of functional modules 301-305, the components of a device 300 according to various embodiments of the present disclosure. The device 300 includes at least a first receive module 301 configured to perform step S201 of the method 200 described with reference to FIGS. 2A to 2D, a detection module 302 configured to perform step S202 (such as e.g., the object detection module 210), a determination module 303 configured to perform step S203 (such as e.g., the tracking parameter module 220), and a tracking module 304 configured to perform step S204 (such as e.g., the object tracking module 230).

In general terms, each functional module 301-304 may be implemented in hardware or in software. Preferably, one or more or all functional modules 301-304 may be implemented by the processing circuitry 310, possibly in cooperation with the communications interface 330 and/or the storage medium 320. The processing circuitry 310 may thus be arranged to from the storage medium 320 fetch instructions as provided by a functional modules 301-304, and to execute these instructions and thereby perform any steps of the method 200 performed by the device 300 as disclosed herein. If provided as hardware, each module 301-304 may be separate from the other modules. In other embodiments, one, more or all of the modules 301-304 may be implemented as parts of a same, physical module, or similar.

In some embodiments, the device 300 may further include additional functional modules (illustrated by the dashed box 305) as required to perform other tasks of the device 300, e.g., as defined by the accompanying dependent claims. A communications bus 352 (logical or physical) is provided to allow the various functional modules 301-304 (and optionally 305) to communicate/exchange data and information as required.

Although not illustrated in any drawings and Figures hereof, the present disclosure also provides a computer program and computer program product as already described herein. The computer program product includes a computer-readable storage medium on which the envisaged computer program is stored. As described already, the computer program includes computer code that, when run on processing circuitry (such as 310) of a device (such as 300), the computer code causes the device to perform any method disclosed and discussed herein, e.g., by executing the steps S201-S204 of the method 200 described with reference to FIGS. 2A to 2D. Consequently, the computer program and/or computer program product may thus provide the means for performing any steps of e.g., the method 200 and/or to make the envisaged device 300 operate as intended.

The computer program product can be provided for example as an optical disc, such as a CD (compact disc) or a DVD (digital versatile disc) or a Blu-Ray disc. The computer program product could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, the computer program can be stored in any way which is suitable for the computer program product, i.e., on the computer-readable storage medium.

In summary of the various embodiments presented herein, the present disclosure provides an improved way of tracking objects in an image stream, in that it allows for one or more tracking parameters used by an object tracker to depend on where a particular object is located in an image frame depicting a scene, and in some embodiments also to depend on which object class the particular object belongs to. This may be particular useful when e.g., a camera captures a scene wherein multiple objects are present and move at different speeds, suddenly change directions, or e.g., where an uncertainty of the movement of the objects are high due to objects sometimes, but not always, changing their speed or direction of movement in some parts of the scene. By making the tracking parameter location and/or object class specific, the envisaged solution herein helps the object tracker to more accurately handle also such situations and scenes. The envisaged solution is also beneficial in that the actual functioning of the object detector and/or object tracker need not to be changed, but only requires to modify the tracking parameter values used by the object tracker.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words “comprising” and “including” does not exclude other elements, and the indefinite article “a” or “an” does not exclude a plurality. The mere fact that certain features are recited in mutually different dependent claims does not indicate that a combination of these features cannot be used to advantage.

The invention claimed is:

1. A method for tracking an object in a scene, including:

receiving a first image frame of a first image stream capturing a scene;

detecting or tracking a first object in the first image frame, and determining that the first object is in a first part of the first image frame or scene;

determining, using object detection, that the first object belongs to a first object class;

determining, based on a predefined set of expected values of a tracking parameter each specific for different parts of the first image frame or scene and for different object classes, a first value of the tracking parameter for the first part of the first image frame or scene and for the first object class, wherein the predefined set of expected values provides a mapping from image frame coordinates or scene coordinates to respective tracking parameter values for each object class, and tracking the first object in a second image frame of the first image stream subsequent to the first image frame, based on the obtained first value of the tracking parameter.

2. The method according to claim 1, wherein the method further includes:

detecting another, second object in the first image frame, and determining that the second object is in a second part of the first image frame or scene;

determining, using object detection, that the second object belongs to a second object class different from the first object class;

determining, based on the predefined set of expected values for the tracking parameter, a second value of the tracking parameter for the second part of the first image or scene and for the second object class, and tracking the second object in the second image frame of the first image stream, based on the second value of the tracking parameter.

3. The method according to claim 1, wherein the tracking parameter includes at least one of:

object speed;

object movement direction;

object size;

a threshold or score for object detection, and an object occurrence frequency.

4. The method according to claim 1, wherein the predefined set of expected values for the tracking parameter include expected values for the tracking parameter as well as uncertainties for the expected values.

5. The method according to claim 1, further including obtaining the predefined set of expected values for the tracking parameter by:

gathering statistics pertinent to the tracking parameter based on object detection and/or object tracking of one or more objects performed in multiple image frames of an image stream capturing the scene, and generating the predefined set of expected values for the tracking parameter based on the gathered statistics.

6. The method according to claim 1, wherein the image stream including the multiple image frames used to gather the statistics is the first image stream including the first image frame.

7. The method according to claim 1, wherein the method further includes dynamically updating the predefined set of expected values for the tracking parameter based on the detection of the first object in the first image frame or the tracking of the first object in the second image frame.

8. A device for tracking an object in a scene, including processing circuitry and a memory storing instructions that, when executed by the processing circuitry, cause the device to:

receive a first image frame of an image stream capturing a scene;

detect a first object in the first image frame, and determine that the first object is in a first part of the first image frame or scene;

determine, using object detection, that the first object belongs to a first object class;

determine, from a predefined set of expected values of a tracking parameter each specific for different parts of the first image frame or scene and for different object classes, a first value of the tracking parameter for the first part of the first image frame or scene and for the first object class, wherein the predefined set of expected values provides a mapping from image frame coordinates or scene coordinates to respective tracking parameter values for each object class, and track the first object in a second image frame of the first image stream subsequent to the first image frame, based on the obtained first value of the tracking parameter.

9. The device according to claim 8, wherein the device is a monitoring camera configured to generate the first image stream capturing the scene.

10. A non-transitory computer-readable medium for tracking an object in a scene, comprising instructions stored thereon, that when executed on processing circuitry of a device, cause the device to:

receive a first image frame of an image stream capturing a scene;

detect a first object in the first image frame, and determine that the first object is in a first part of the first image frame or scene;

determine, using object detection, that the first object belongs to a first object class;

determine, from a predefined set of expected values of a tracking parameter each specific for different parts of the first image frame or scene and for different object classes, a first value of the tracking parameter for the first part of the first image frame or scene and for the first object class, wherein the predefined set of expected values provides a mapping from image frame coordinates or scene coordinates to respective tracking parameter values for each object class, and track the first object in a second image frame of the image stream subsequent to the first image frame, based on the obtained first value of the tracking parameter.

11. The medium according to claim 10, further comprising instructions stored thereon, that when executed on the processing circuitry of the device, cause the device to:

detect another, second object in the first image frame, and determine that the second object is in a second part of the first image frame or scene;

determine, using object detection, that the second object belongs to a second object class different from the first object class;

determine, based on the predefined set of expected values for the tracking parameter, a second value of the tracking parameter for the second part of the first image or scene and for the second object class, and track the second object in the second image frame of the first image stream, based on the second value of the tracking parameter.

12. The medium according to claim 10, wherein the tracking parameter includes at least one of:

object speed;

object movement direction;

object size;

a threshold or score for object detection, or an object occurrence frequency.

13. The medium according to claim 10, wherein the predefined set of expected values for the tracking parameter include values for the tracking parameter as well as uncertainties for the values.

14. The medium according to claim 10, further comprising instructions stored thereon, that when executed on the processing circuitry of the device and in order to obtain the predefined set of expected values for the tracking parameter, cause the device to:

gather statistics pertinent to the tracking parameter based on object detection and/or object tracking of one or more objects performed in multiple image frames of an image stream capturing the scene, and generate the predefined set of expected values for the tracking parameter based on the gathered statistics.

15. The medium according to claim 14, wherein the image stream including the multiple image frames used to gather the statistics is the first image stream including the first image frame.

16. The medium according to claim 10, further comprising instructions stored thereon, that when executed on the processing circuitry of the device, cause the device to dynamically update the predefined set of expected values for the tracking parameter based on the detection of the first object in the first image frame or the tracking of the first object in the second image frame.

* * * * *